Feb. 26, 1929.
E. B. TARVER
1,703,181
WINDSHIELD WIPER
Filed Nov. 19, 1927
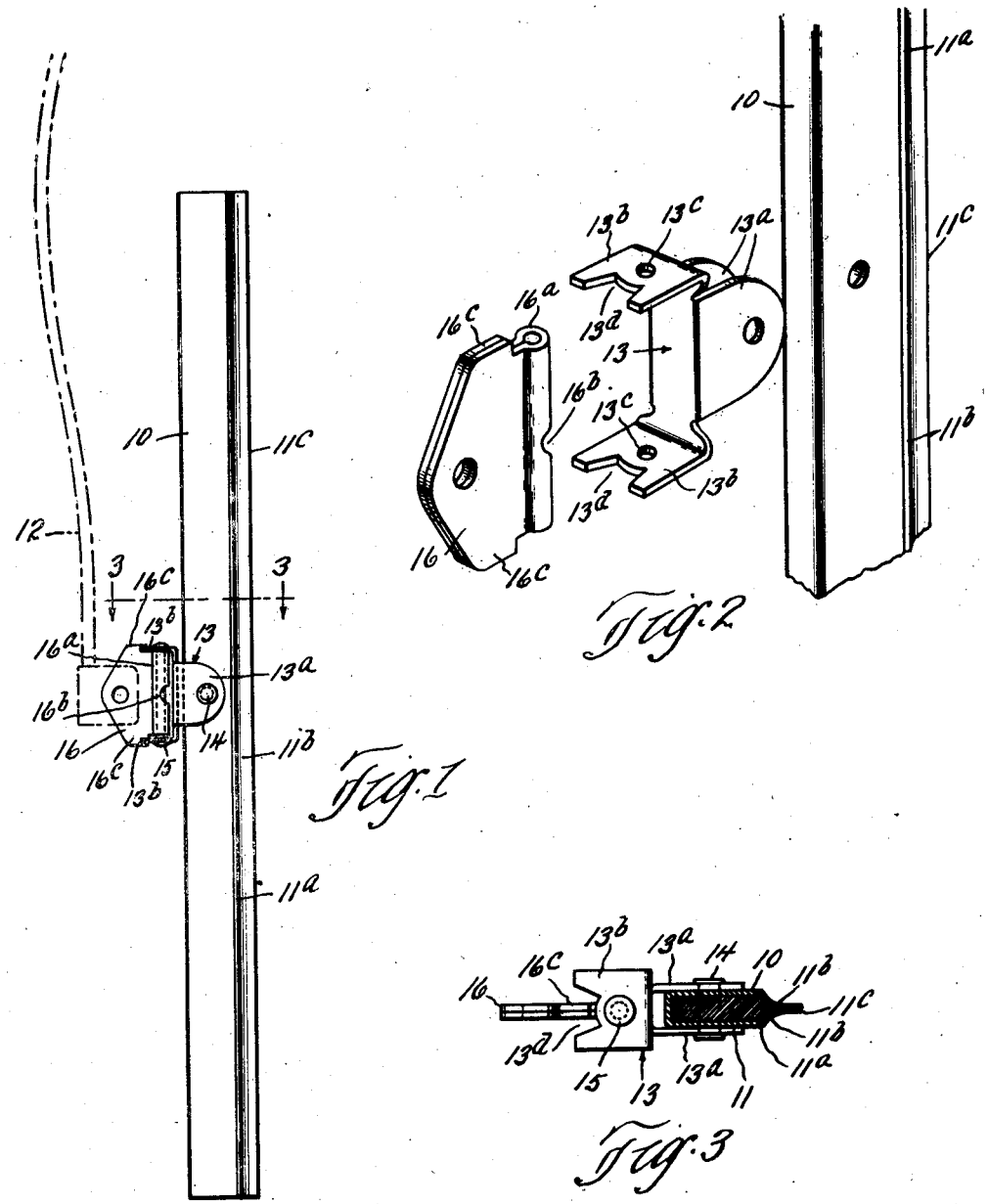

Patented Feb. 26, 1929.

1,703,181

UNITED STATES PATENT OFFICE.

EDWARD B. TARVER, OF LAKEWOOD, OHIO.

WINDSHIELD WIPER.

Application filed November 19, 1927. Serial No. 234,303.

This invention relates generally to windshield cleaner and more particularly to the wiper portion thereof.

While the invention is particularly adapted for automatic windshield cleaners, it will of course be understood that it is equally well adapted for the hand operated device. It will also be understood that the wiper and means for connecting the same to the operating arm can be used in connection with any of the types of windshield cleaners now in use.

The object of the invention is to provide a wiper of such construction that when operated it will have the proper rocking or turning action upon the windshield in order to present the proper wiping surface to the glass.

Another object is to provide a wiper which will be more efficient and at the same time more durable than those heretofore employed.

With these various objects in view the invention consists in molding a rubber wiper strip in a channel shaped wiper member and also in providing a novel construction of rockable connection between said wiper member and the actuating arm of the windshield cleaner.

With these various objects the invention consists in the novel features of construction and in the manner of combining or arranging the same, all of which will be fully described hereinafter and pointed out in the appended claims.

In the drawings forming part of this specification, Fig. 1 is a side elevation of my device; Fig. 2 is perspective view, the parts being in separated position; and Fig. 3 is a section on the line 3—3 of Fig. 1.

Inasmuch as my invention is usable in connection with all types of windshield cleaners, it will not be necessary to describe the construction and operation of said cleaners. I will therefore describe in detail those parts which are novel and constitute the essential features of my invention. The wiper member 10 is channel shaped as shown and molded into this channel shaped wiper member 10 is the rubber wiper strip 11 which being molded in the channel shaped member completely fills the same and without the application of pressure upon the walls of the channel member which pressure would tend to push the rubber wiping strip outwardly. This rubber wiping strip is provided with laterally projecting shoulder portions $11^a$ at the opposite sides thereof which rest upon the edges of the channel shaped wiper member and that portion of the rubber wiper projecting beyond the wiper member is tapered in opposite direction as shown at $11^b$ and terminates in the edge $11^c$.

It is well understood that it is the rubber wiping strip only which comes in contact with the glass for the purpose of cleaning the same and the particular construction herein shown and described lends itself particularly well to the wiping action inasmuch as first one edge and then the other is presented to the glass during the wiping operation and an abundance of rubber for the wiping operation will be presented and at the same time sufficient base or foundation portion maintained within the wiper member and without undue pressure upon the rubber.

It is desirable to have the wiper member rockable as the same is oscillated back and forth over the windshield and for this purpose I provide a two-piece coupling or hinge connection between the wiper member 10 and the actuating arm 12, one member 13 connected to the wiper member comprising the parallel ears $13^a$ between which the wiper member is positioned and a pivot 14 passed therethrough. The member 13 also comprises parallel bearing portions $13^b$ each having an aperture $13^c$ to receive the pivot pin 15. These parallel bearing members are also notched or recessed as shown at $13^d$ in order to permit the rocking movement between the wiper member and the actuating arm and the notches or recesses $13^d$ can be made of varying angularity so as to permit a greater or lesser rocking movement as may be desired. Ordinarily a rocking action of from 30° to 40° is ample and to effect this the sides of the notches $13^d$ are cut at an angle of from 15° to 20°. The connecting member 16 is also made from a single piece of sheet metal folded back upon itself to provide a barrel-like portion $16^a$ through which the pivot 15 passes thereby effecting the pivotal connection between the parts 13 and 16. The barrel portion $16^a$ has an opening $16^b$ in order to permit the proper shaping and bending of the member 16. At each end there is a projection $16^c$ which extends a short distance above and below the barrel portion $16^a$ and occupies the notched portion $13^d$ of the bearing members $13^b$ and it is the contact of these projections $16^c$ with the sides of the notches 13ᵈ that limits the rocking movements of the wiper member. The member 16 is connected to the actuating arm 12 in any suitable manner.

From the above, it will be noted that there is the proper rocking connection between the actuating arm and the wiper member and that there is also the proper rocking connections between the members themselves and also between the wiper member and connectors.

Having thus described my invention, what I claim is:—

1. In a windshield cleaner a wiper and an actuating arm, and means connecting said wiper and actuating arm, said means including a sheet metal member having parallel ears between which the wiper is arranged and parallel bearing portions and a pivot passing through said bearing portions, said bearing portions being notched to limit the rocking movement of the wiper with reference to the actuating arm.

2. In a windshield cleaner, a wiper and an actuating arm, a connection between the wiper and the actuating arm, said connection comprising one member having parallel ears between which the wiper member is arranged and parallel apertured and notched bearing members, a second member folded upon itself and provided with a barrel portion arranged between the parallel bearing members and having projecting portions adapted for engagement with said bearing members and a pivot passing through the bearing members and barrel portion.

In testimony whereof, I hereunto affix my signature.

EDWARD B. TARVER.